US012138933B2

(12) United States Patent
Omer et al.

(10) Patent No.: US 12,138,933 B2
(45) Date of Patent: Nov. 12, 2024

(54) PRINT HEAD CONNECTOR ASSEMBLY

(71) Applicant: VIDEOJET TECHNOLOGIES INC., Wood Dale, IL (US)

(72) Inventors: Salhadin Omer, Cambridge (GB); Ben Tuncay Arslan, Cambridge (GB)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

(21) Appl. No.: 17/057,717

(22) PCT Filed: Dec. 19, 2019

(86) PCT No.: PCT/GB2019/053620

§ 371 (c)(1),
(2) Date: Nov. 23, 2020

(87) PCT Pub. No.: WO2020/141313

PCT Pub. Date: Jul. 9, 2020

(65) Prior Publication Data

US 2021/0197570 A1 Jul. 1, 2021

(30) Foreign Application Priority Data

Jan. 4, 2019 (GB) ..................................... 1900123

(51) Int. Cl.
*B41J 2/175* (2006.01)
*B41J 2/14* (2006.01)

(52) U.S. Cl.
CPC ................. *B41J 2/175* (2013.01); *B41J 2/14* (2013.01); *B41J 2002/14491* (2013.01)

(58) Field of Classification Search
None
See application file for complete search history.

(56) References Cited

U.S. PATENT DOCUMENTS 3,753,582 A * 8/1973 Graham .............. F16L 37/0885 37/459
5,439,029 A 8/1995 Becker
(Continued)

FOREIGN PATENT DOCUMENTS

CN 1051885 A 7/1993
CN 1642744 A 7/2005
(Continued)

OTHER PUBLICATIONS

PCT/GB2019/053620 International Search Report and Written Opinion, dated Mar. 30, 2020, 13 pages.
Chinese Patent Office Action dated Aug. 3, 2022 in Chinese Patent Application No. 2019800364441.

*Primary Examiner* — Alejandro Valencia
(74) *Attorney, Agent, or Firm* — Delizio, Peacock, Lewin & Guerra, LLP

(57) ABSTRACT

There is a print head connector assembly for a printer, the print head connector assembly providing at least one continuous fluid and/or electrical connection between a first port and a second port, the at least one continuous connection being provided by at least one conduit. The print head connector assembly comprises: a first component connectable to an umbilical conduit at the first port; a second component connectable to a print head at the second port, wherein one of the first component and the second component comprises a print head connection axis at the second port and the other of the first component and the second component comprises an axis of rotation, the first component and the second component housing the at least one conduit; adjustment means between the first component and the second component for adjusting the print head connector assembly into a plurality of configurations.

41 Claims, 10 Drawing Sheets

(56) References Cited

U.S. PATENT DOCUMENTS

| | | | | |
|---|---|---|---|---|
| 5,457,484 | A * | 10/1995 | Regnault | B41J 2/02 347/90 |
| 5,653,605 | A * | 8/1997 | Woehl | H01R 13/622 439/321 |
| 6,102,447 | A * | 8/2000 | Aldridge | F16L 37/0885 285/308 |
| 6,254,216 | B1 * | 7/2001 | Arway | B41J 2/1707 347/29 |
| 7,789,432 | B2 * | 9/2010 | Dohm | F16L 27/0861 285/275 |
| 9,427,861 | B2 * | 8/2016 | Reynolds | B25G 1/085 |
| 2005/0110836 | A1 | 5/2005 | Colombat et al. | |
| 2009/0189960 | A1 * | 7/2009 | Matsuda | B41J 2/03 347/77 |
| 2010/0085401 | A1 * | 4/2010 | Murad | B41J 3/4073 347/37 |
| 2014/0310882 | A1 | 10/2014 | Reynolds | |

FOREIGN PATENT DOCUMENTS

| | | | |
|---|---|---|---|
| CN | 102171050 | A | 8/2011 |
| CN | 106058526 | A | 10/2016 |
| EP | 3075547 | A2 | 10/2016 |
| GB | 2477871 | A | 8/2011 |
| GB | 2484589 | A | 4/2012 |
| JP | 2002254651 | A | 9/2002 |
| JP | 2007 190724 | A | 8/2007 |
| WO | 2009098494 | A2 | 8/2009 |

* cited by examiner

PRINT HEAD CONNECTOR ASSEMBLY

FIELD OF THE INVENTION

The present invention relates to a print head connector assembly for a printer, in particular for an ink jet printer, in particular for a continuous ink jet printer. It also relates to a printer equipped with such a print head connector assembly, in particular an ink jet printer, in particular a continuous ink jet printer.

BACKGROUND TO THE INVENTION

Printers are used in a variety of applications to apply text or an image to a substrate. A printer typically includes a printer cabinet, a print head and an umbilical cable (or conduit) running from and connecting the printer cabinet to the print head.

Depending on the type of printing used, the umbilical cable often carries a wire or conduit for a specific purpose. For example, in inkjet printing, the umbilical cable often carries approximately ten or more different wires and conduits for any combination of, for example, ink supply, ink return, air supply, control signals, sensor data, the recirculating of pigmented ink, high voltage supply to deflection electrodes etc. Therefore, for such purposes, a print head of a printer may be provided with one or more electrical and/or fluid fittings. Each of these fittings is connected during assembly and/or replacement of a print head, and the connection of an umbilical cable transporting data and/or fluids and/or electrical signals to the print head can be a complicated process, and one requiring precision and delicacy. For the function of the print head and associated printer, it is important that the connections and fittings remain stable and secure.

Print heads are generally configured at manufacture to have a particular orientation, typically either straight (180°) or right-angled (90°), depending on the operational and/or environmental constraints on the manufacturing line or otherwise. For example, in the straight configuration, the print head is mounted in line with the umbilical cable. In the right-angled configuration, the print head may be mounted in line with the umbilical cable, but the print head may include a 90 degree bend, or alternatively, the print head may be mounted at a 90 degree angle to the umbilical cable.

In any case, the orientation is generally fixed; the print head is mounted to an assembly using a standard arrangement of mounting screw holes and corresponding screws. Therefore, a user must determine what print head geometry best fits a specific application before purchasing a print head. For some applications, a user may need to keep two or more different print heads or printers because one application may require one orientation and/or plane of printing whilst another application may require a different orientation and/or different plane of printing. Over time, the orientation and/or plane of printing required by a particular application may change and so a user may need to acquire further print heads or printers to accommodate for the change. This can be expensive and can cause delays on the manufacturing line, requiring the ordering of new parts and/or time to change the parts.

It would be desirable to provide a print head connector assembly that overcomes one or more of the above problems. It would be desirable to provide a print head connector assembly which allows a stock print head to be fitted with different orientations/configurations.

SUMMARY OF THE INVENTION

Aspects of the present invention are set out in the independent claims and preferred embodiments of the present invention are set out in the dependent claims. Features of one aspect or embodiment of the present invention as described and shown herein may be provided in conjunction with any other aspects or embodiments, or features thereof, described herein, as appropriate and applicable.

According to a first aspect of the present invention there is provided a print head connector assembly for a printer, the print head connector assembly providing at least one continuous fluid and/or electrical connection between a first port and a second port, the at least one continuous connection being provided by at least one conduit, wherein the print head connector assembly comprises:

a first component connectable to an umbilical conduit at the first port;

a second component connectable to a print head at the second port, wherein one of the first component and the second component comprises a print head connection axis at the second port and the other of the first component and the second component comprises an axis of rotation, the first component and the second component housing the at least one conduit;

adjustment means between the first component and the second component for adjusting the print head connector assembly into a plurality of configurations, wherein each of the plurality of configurations has a respective rotational relationship between the first component and the second component, and wherein in each of the plurality of configurations the print head connection axis and the axis of rotation are substantially parallel and aligned; and a locking component for locking the print head connector assembly in each of the plurality of configurations.

Providing an adjustment means for changing a respective rotational relationship between a first component of a print head connector assembly connectable to an umbilical cable and a second component of a print head connector assembly connectable to a print head in this way, allows a user (or service engineer during installation of a new printer) to vary the respective rotational relationship between the components and therefore select a desired orientation/configuration and/or plane of printing for a print head connected to the second component. Further providing a locking component for locking the components in place in the respective rotational relationship, allows the user to secure a print head connected to the second component in place in the selected orientation/configuration and/or to have a desired plane of printing.

This combination of features allows a single print head to be used for a plurality of applications, even where there is a change in the particular application concerned or in the environment on the product manufacturing line, where space can be limited. This can reduce the costs associated with a user buying multiple print heads or printers for the different and/or changing applications/requirements on the printing line.

The at least one conduit may provide an outer casing to one or more conduits for carrying fluid, or to one or more conduits or cables for carrying one or more wires. The fluid may be gas or liquid. The wires may carry electrical signals and/or may provide electrical energy to one or more print head components.

The print head connection axis may pass through the centre of the part of the print head that connects to the print head connector assembly at the second port, and/or run substantially parallel to an outer surface of the print head and an outer surface of the print head connector assembly at the connection point.

Substantially parallel in any of the above circumstances may mean that the features and/or axes are effectively parallel, but may account for any manufacturing tolerances that mean they aren't perfectly parallel.

The plurality of configurations may comprise a discrete number of different configurations. The number of different configurations may be between 34 and 38, for example it may be 36. When the print head connector assembly is in one of the plurality of configurations, for example in a default position or configuration, there may be 35 other different configurations into which the print head connector assembly can be adjusted.

The print head connector assembly, for example the first component and/or the second component, may comprise an indicator for indicating which one of the plurality of configurations the print head connector assembly is in. The indicator may comprise one or more visual markings. The number of visual markings may be equal to the number of different configurations.

The locking component locks the print head connector assembly sufficiently such that a connected printer and print head can operate effectively. That is, in normal use, the printhead will remain in the locked configuration unless the locking component is unlocked, and the printhead re-configured.

In the above and/or below, relative rotation may mean that either part referred to can be rotated relative to the other part referred to. For instance, where rotation of the first component relative to the second component is referred to, this may equally be rotation of the second component relative to the first component.

The first component may be rotated relative to the second component and/or the second component may be rotated relative to the first component further, and/or by a greater number of increments, in one direction, for example in a clockwise direction or in an anti-clockwise direction, for example from a default position or configuration of the first component and the second component. The first component may be rotated relative to the second component and/or the second component may be rotated relative to the first component into 27 configurations in one direction, for example clockwise, and into 8 configurations in the other direction, for example anticlockwise, for example from a default position or configuration of the first component and the second component. The first component may be rotated relative to the second component and/or the second component may be rotated relative to the first component through 270 degrees, or a three-quarter turn, in one direction, for example clockwise, and through 80 degrees in the other direction, for example anticlockwise, for example from a default position or configuration of the first component and the second component.

The first component and the second component may be configured to have a variable resistance to relative rotation, wherein the resistance to relative rotation is a function of the respective rotational relationship between the first component and the second component. The adjustment means, and/or the configuration thereof, may provide the variable resistance to relative rotation.

When the first component and the second component are in one of the plurality of configurations, the first component and the second component may be configured to have a first resistance to relative rotation, and when the first component and the second component are in an intermediate position between two of the plurality of configurations, the first component and the second component may be configured to have a second resistance to relative rotation, wherein the first resistance to relative rotation may be greater than the second resistance to relative rotation.

When the first component and the second component are in one of the plurality of configurations, a first force may be required to rotate the second component relative to the first component, and when the first component and the second component are in an intermediate position between two of the plurality of configurations, a second force may be required to rotate the second component relative to the first component, wherein the first force may be greater than the second force. The force required to rotate the first component relative to the second component may vary as a function of the respective rotational relationship between the first component and the second component.

The magnitude of the first force may correspond to the magnitude of the first resistance. The magnitude of the second force may correspond to the magnitude of the second resistance.

When the first component and the second component are in one of the plurality of configurations, the first and second component may be fully engaged, and when in an intermediate position between two of the plurality of configurations, the first and second component may be partially engaged or out of engagement.

The first component and the second component may have a resistance to relative rotation that is greater when the first and second component are fully engaged, that is smaller when the first and second component are partially engaged, and that is smallest when the first and second component are out of engagement.

The adjustment means may comprise a first engagement means on the first component, and a second engagement means on the second component for cooperating with the first engagement means in each of the plurality of configurations. Providing cooperating first and second engagement means in this way may allow a user to more easily select a desired orientation/configuration and/or plane of printing by rotating a print head connected to the second component relative to the first component.

The first engagement means and the second engagement means may comprise first and second cooperating surfaces respectively. The cooperating surfaces may be generally parallel. When in one of the plurality of configurations, the first and second cooperating surfaces may be fully engaged, and when in the intermediate position, the first and second cooperating surfaces may be partially engaged or out of engagement.

The adjustment means may comprise a flexible and/or resilient material. The first engagement means and the second engagement means, and/or the first and second cooperating surfaces, may comprise a flexible and/or resilient material. This may allow for a clicking sound to be produced as the first engagement means and the second engagement move in and out of engagement. This may allow a user to more easily and/or conveniently know how the respective rotational relationship has changed.

The first component may be hollow, and the first engagement means may comprise a first plurality of spaced apart retaining features disposed on a surface of the first component. The surface of the first component may be an inner surface. The first component may act as an internal gear. The inner surface may be undulating, and may be similar in profile to that of a sinusoidal wave. The inner surface may be the first cooperating surface. The undulations may provide the first engagement means and/or the parts of one of the undulations that are more internal to the first component may provide one of the first plurality of spaced apart retaining features. The first plurality of spaced apart retaining features may comprise a resilient material.

The first plurality of spaced apart retaining features may be spaced apart at regular intervals. The first plurality of spaced apart retaining features may be spaced apart at regular intervals around the circumference of the inner surface of the first component, or the aperture. The first plurality of spaced apart retaining features may be spaced apart at pre-determined intervals that are customised for a particular purpose and/or configuration. The first plurality of spaced apart retaining features may extend around the entire circumference, or alternatively around a part of the circumference.

The first plurality of spaced apart retaining features may be spaced apart such that adjacent retaining features have an angular offset of approximately 10 degrees. That is, a centre of two adjacent retaining features in the first plurality of spaced apart retaining features may have an angular separation of this amount. Other angular offsets are of course possible. The angular offset may instead be less than approximately 10 degrees, or it may be more than approximately 10 degrees. The angular offset may be between approximately 10 degrees and approximately 30 degrees, or between approximately 30 degrees and approximately 45 degrees, or between approximately 45 degrees and approximately 90 degrees. Providing the retaining features at regular intervals around the circumference of the inner surface of the aperture and/or such that the retaining features have a particular angular offset may allow a user to more easily adjust the print head connector assembly to a more specific, desired orientation/configuration.

The first plurality of spaced apart retaining features may be notches. The notches may be approximately U-shaped or approximately V-shaped.

The second engagement means may comprise a second plurality of spaced apart retaining features disposed on at least a part of a surface of the second component, and the at least a part of the second component may be configured to engage with the first component. The second engagement means may comprise a second plurality of spaced apart retaining features disposed on at least a part of an outer surface of the second component, and the at least a part of the second component may be received in the first component. The second component may act as an external gear cooperating with the first component acting as an internal gear. The outer surface may by undulating, and may be similar in profile to that of a sinusoidal wave. The undulations on the first and second components may cooperate. The outer surface may be the second cooperating surface. The undulations may provide the second engagement means and/or the parts of one of the undulations that are more external to the second component may provide one of the second plurality of spaced apart retaining features. The second plurality of spaced apart retaining features may comprise a resilient material.

The second plurality of spaced apart retaining features may comprise a resilient material. In combination with the first plurality of spaced apart retaining features comprising a resilient material, this may allow the retaining features to produce a clicking sound as one of the second plurality of spaced apart retaining features moves over one of the first plurality of spaced apart retaining features, providing an easy and effective way of allowing a user to know how the respective rotational relationship has changed.

When the first component and the second component rotate relative to each other, the first plurality of spaced apart retaining features and the second plurality of spaced apart retaining features may be configured to produce a clicking sound as one of the second plurality of spaced apart retaining features moves over one of the first plurality of spaced apart retaining features.

The second plurality of spaced apart retaining features may be spaced apart at regular intervals around the surface of the second component. The second plurality of spaced apart retaining features may be spaced apart at regular intervals around the circumference of the outer surface of the second component. The second plurality of spaced apart retaining features may be spaced apart at pre-determined intervals that are customised for a particular purpose and/or configuration. The second plurality of spaced apart retaining features may extend around a part of the circumference, for instance approximately 90 degrees, or for instance less than approximately 90 degrees, or alternatively they may extend around the entire circumference.

The second plurality of spaced apart retaining features may be spaced apart such that adjacent retaining features have an angular offset of approximately 10 degrees. Other angular offsets are of course possible. The angular offset may instead be less than approximately 10 degrees, or it may be between approximately 10 degrees and approximately 30 degrees, or between approximately 30 degrees and approximately 45 degrees, or between approximately 45 degrees and approximately 90 degrees. The angular offset of the first plurality of spaced apart retaining features and the second plurality of spaced apart retaining features may be substantially equal. The angular offset of the first plurality of spaced apart retaining features may be a multiple of the offset of the second plurality of spaced apart retaining features. The angular offset of the second plurality of spaced apart retaining features may be a multiple of the offset of the first plurality of spaced apart retaining features.

The second plurality of spaced apart retaining features may be teeth, and the teeth and the notches may be configured for engagement. The teeth and the notches may have corresponding shapes, and/or corresponding surfaces, and/or sizes. Teeth and cooperating notches may provide a simple but effective way of providing for relative rotation and cooperation between parts. The teeth may be approximately U-shaped or approximately V-shaped.

The first component may comprise the first engagement means on, or the first cooperating surface may be, or the first plurality of spaced apart retaining features may be on, or the notches may be on, a first surface that is substantially perpendicular to the print head connection axis, and/or the second component may comprise the second engagement means on, or the second cooperating surface may be, or the second plurality of spaced apart retaining features may be on, or the teeth may be on, a second surface that is substantially perpendicular to the print head connection axis. The first and second surfaces may be generally, and/or substantially, parallel.

The first component may be rotated relative to the second component and/or the second component may be rotated relative to the first component by less than 360°, or by less than +180°. The first component may be rotated relative to the second component and/or the second component may be rotated relative to the first component by 360°, or by 350°, or by +180°, but may not be rotated by more than 360°, or 350° or +180°. For either of these relative rotations, all possible angular positions may be covered and so to provide any further rotation may cause unnecessary twisting of the cables and potential stress on the conduits.

The first component may be rotated relative to the second component and/or the second component may be rotated relative to the first component by 350°, optionally in 10° increments.

The print head connector assembly may comprise a positive stop to prevent relative rotation of the first component and the second component by further than is desired and/or required. The positive stop may comprise a protrusion on the first component and/or the second component. The stop may prevent unnecessary and excessive twisting of the cables and potential stress on the conduits. The first component may comprise the positive stop and/or the second component may comprise the positive stop. The first component may comprise a first part of the positive stop and the second component may comprise a second part of the positive stop for cooperating with the first part of the positive stop.

One of the first plurality of spaced apart retaining features may provide the positive stop, or one of the parts of the first component between two consecutive spaced apart retaining features of the first plurality of spaced apart retaining features may provide the positive stop. The one of the parts of the first component may protrude further than the other similar parts of the first component such that one of the second plurality of spaced apart retaining features may not be able to rotate past or over the one of the parts of the first component. This therefore provides for a positive stop.

The second component may comprise a plurality of mounting holes on an end surface thereof for cooperating with a corresponding plurality of mounting holes on a print head. In particular, there may be three mounting holes, and each one may sit on the corner of an imaginary triangle. This may allow for a stock print head, typically comprising a set number of mounting holes (e.g. two or three or four, or more than four), to be connected to the second component, and so to the print head connector assembly. The mounting holes may be configured for receiving a fastening member, optionally a screw.

The locking component may have a locked configuration and an unlocked configuration, wherein when the locking component is in the locked configuration, a third force may be required to rotate the second component relative to the first component, and when the locking component is in the unlocked configuration, a fourth force may be required to rotate the second component relative to the first component, wherein the third force may be greater than the fourth force.

When the first component and the second component are in one of the plurality of configurations and the locking component is in the locked configuration, the force required to rotate the second component relative to the first component may be at a maximum. This may be the position in which operation of a printer and print head connected to the print head connector assembly takes place.

When the first component and the second component are in one of the plurality of configurations, the first component and the second component may be configured to have a first resistance to relative rotation, and wherein when the first component and the second component are in an intermediate position between two of the plurality of configurations, the first component and the second component may be configured to have a second resistance to relative rotation, wherein the first resistance to relative rotation may be greater than the second resistance to relative rotation.

Moving the locking component into the locked configuration may urge the first component and the second component into one of the plurality of configurations.

The locking component may provide the first component and the second component with a variable resistance to relative rotation. When the locking component is in its locked configuration, the resistance to relative rotation may comprise a third resistance, and when the locking component is in its unlocked configuration, the resistance to relative rotation may comprise a fourth resistance. The third resistance may be higher than the fourth resistance. It may be difficult for a user to overcome the third resistance to relative rotation and/or may require significant force that the print head connector assembly would only be exposed to via sources external to the print head connector assembly. This may allow the print head connector assembly to stay in one of the plurality of configurations when the locking component is in its locked configuration.

The magnitude of the third force may correspond to the magnitude of the third resistance. The magnitude of the fourth force may correspond to the magnitude of the fourth resistance.

The second component may have a cross section comprising an open section between two edges thereof, wherein the second component may be urgeable into a locked configuration in which the two edges are forced outwardly away from one another, and wherein the locking component is configured and arranged to urge the second component into its locked configuration, the second component being in its locked configuration when the locking component is in its locked configuration.

When the two edges are forced outwardly, this may prevent the second component from flexing, which may prevent the adjustment means from being adjusted.

When the second component is in its locked configuration, the second component may be in an expanded configuration.

The locking component may comprise a wedge portion configured to be reversibly driven between the two edges of the open section for urging the second component into its locked configuration.

The wedge portion may comprise a through hole for receiving a fastening member therethrough, optionally wherein the through hole provides a mounting hole on an end surface of the second component. This may be a particularly effective way of locking the assembly in the selected rotational configuration. The fastening member may be a screw.

One of the plurality of mounting holes may provide the through hole. Where the wedge portion comprises a through hole for receiving a fastening member, the fastening member for mounting the print head to the print head connector assembly may have a dual purpose, for connecting the print head to the print head connector assembly and locking the print head in the desired configuration.

The second component may be urged into its locked configuration by fastening a fastening member, for instance screwing a screw, into the locking component to move the locking component into the open section. Unfastening the fastening member, for instance unscrewing the screw, may permit the wedge portion to be withdrawn from between the two edges of the open section to move the second component out of its locked configuration.

Where the first component may comprise the first engagement means on, or the first cooperating surface may be, or the first plurality of spaced apart retaining features may be on, or the notches may be on, a surface that is substantially perpendicular to the print head connection axis, and/or where the second component may comprise the second engagement means on, or the second cooperating surface may be, or the second plurality of spaced apart retaining features may be on, or the teeth may be on, a surface that is substantially perpendicular to the print head connection axis, and wherein the first and second surfaces may be generally parallel, the locking component may be configured to urge and/or clamp the first and second surfaces towards each other, or together, when in its locked configuration, and the first and second surfaces may be able to rotate relative to each other when the locking component is in its unlocked configuration and the first and second surfaces are not urged and/or clamped towards each other, or together.

The first component may comprise a substantially right-angled bend therein. This may be more suitable for the environment in which a printer connected to the print head connector assembly may be used.

The first component may comprise a first member and a second member, and the first member may be connected to the second member at substantially a right angle. The connection between the first member and the second member may be rotatable to allow the first member to rotate relative to the second member. This may provide the print head connector assembly with extra degrees of freedom, providing the user with more adjustability of a print head connected to the print head connector assembly, and/or may make the print head connector assembly suitable for more applications and/or printer environments.

The print head connector assembly may define an enclosed volume between the first port and the second port, the at least one conduit being free to move within the enclosed volume, wherein the at least one conduit may be arranged in a pre-twisted configuration and may be sufficiently slack to allow for movement and/or twisting of the at least one conduit within the enclosed volume.

The first component and the second component may define the enclosed volume between the first port and the second port.

Pre-twisting the at least one conduit in this way, so that the conduit does not follow the shortest path through the assembly, and ensuring that the conduit is sufficiently slack, may account for parts of the assembly being rotated relative to one another to prevent the conduit being moved or twisting too much during selection of the desired orientation/configuration and/or plane of printing.

The print head connector assembly may comprise a guide assembly for allowing the at least one conduit to pass through the second component, and the print head connector assembly may further comprise a clamp configured to secure the at least one conduit in the print head connector assembly.

The at least one conduit may comprise a conduit or cable for providing the continuous electrical connection.

The provision of such a clamp may be particularly useful where parts of the assembly are being rotated relative to one another, since it may help prevent too much movement and/or twisting of the conduit or cable for providing the continuous electrical connection. This may help prevent the electrical connection from breaking down.

The second component may comprise a first aperture, and a second aperture may be defined at the second port where the second component connects to a print head, and the guide assembly may comprise the first aperture and the second aperture, and the clamp may be configured to move axially away from the first aperture and towards the second aperture to reduce the effective size of the second aperture for securing the at least one conduit in the print head connector assembly.

The second aperture may be smaller than the first aperture. The first and second apertures may not have the same centre axis. This may provide the guide assembly with a more suitable arrangement for clamping.

The print head connector assembly may further comprise a third component for connecting to the second component and for sealing a connection between the second component and a print head, and the third component may define the second aperture. The third component may be a gasket plate.

The clamp may be configured to move along an axis substantially parallel to the print head connection axis and the axis of rotation to secure the at least one conduit in the print head connector assembly.

The clamp may comprise a through hole for receiving a fastening member, for instance a screw, and the clamp may be activated, or moved axially, by inserting a fastening member, for instance the screw, in the through hole and tightening the fastening member, for instance the screw.

The print head connector assembly may provide at least two continuous fluid and/or electrical connections between the first port and the second port, the at least two fluid and/or electrical connections being provided by two conduits. The print head connector assembly may provide at least three continuous fluid and/or electrical connections between the first port and the second port, the at least three fluid and/or electrical connections being provided by three conduits.

The print head connector assembly may provide at least one continuous fluid connection between the first port and the second port, the at least one continuous fluid connection being provided by a first conduit, and at least one continuous electrical connection between the first port and the second port, the at least one continuous electrical connection being provided by a second conduit.

The at least one continuous fluid connection may comprise any one or more of an ink supply to a print head connected to the print head connector assembly, an ink return from a print head connected to the print head connector assembly, and an air supply to a print head connected to the print head connector assembly. Ink return may draw solvent saturated air in with ink from a gutter of a print head connected to the print head connector assembly.

The at least one continuous electrical connection may comprise any one or more of control signals to a print head connected to the print head connector assembly, sensor data to or from a print head connected to the print head connector assembly, and high voltage supply to deflection electrodes in a print head connected to the print head connector assembly.

The plurality of configurations may comprise three or more configurations, or optionally more than four configurations. The plurality of configurations may comprise thirty five or more configurations, or thirty six or more configurations. This may provide significant flexibility and customisability of the configuration of a printer and print head connected to the print head connector assembly. Allowing for more possible orientations/configurations and/or planes of printing provides more choice for selection of an orientation/configuration and/or plane of printing by a user.

The printer may comprise an ink jet printer. The printer may comprise a continuous ink jet printer.

According to a second aspect of the present invention, there is provided a printer comprising:

a printer cabinet connected to an umbilical conduit;

a print head; and a print head connector assembly providing at least one continuous fluid and/or electrical connection between the umbilical conduit and the print head, the at least one continuous connection being provided by at least one conduit, wherein the print head connector assembly comprises:

a first component connectable to the umbilical conduit;

a second component connectable to the print head, wherein one of the first component and the second component comprises a print head connection axis at the print head and the other of the first component and the second component comprises an axis of rotation, the first component and the second component housing the at least one conduit;

adjustment means between the first component and the second component for adjusting the print head connector assembly into a plurality of configurations, wherein each of the plurality of configurations has a respective rotational relationship between the first component and the second component, and wherein in each of the plurality of configurations the print head connection axis and the axis of rotation are substantially parallel and aligned; and a locking component for locking the print head connector assembly in each of the plurality of configurations;

wherein the print head connector assembly is arranged to connect the print head to the umbilical cable such that the print head is adjustable into, and lockable in, the plurality of configurations having a respective rotational relationship between the first component and the second component.

The printer may be an ink jet printer. The printer may be a continuous ink jet printer. The printer cabinet may comprise an ink supply system. The printer may be configured to have ink delivered under pressure from the ink supply system to the print head, and recycled back to the ink supply system via the umbilical conduit. The print head may be disposed outside of the cabinet, and connected to the cabinet via the umbilical cable.

According to a third aspect of the present invention, there is provided a method of assembling a print head connector assembly, the print head connector assembly providing at least one continuous fluid and/or electrical connection between a first port and a second port, the at least one continuous connection being provided by at least one conduit, comprising:

providing a first component connectable to an umbilical conduit at the first port;

providing a second component connectable to a print head at the second port, wherein one of the first component and the second component comprises a print head connection axis at the second port, and the other of the first component and the second component comprises an axis of rotation, the first component and the second component housing the at least one conduit;

providing adjustment means between the first component and the second component for adjusting the print head connector assembly into a plurality of configurations, wherein each of the plurality of configurations has a respective rotational relationship between the first component and the second component, and wherein in each of the plurality of configurations the print head connection axis and the axis of rotation are substantially parallel and aligned; and providing a locking component for locking the print head connector assembly in each of the plurality of configurations.

The print head connector assembly may provide a first continuous fluid or electrical connection assembly provided by a first conduit assembly, and a second continuous fluid or electrical connection assembly provided by a second conduit assembly, the first component and the second component housing the first and second conduit assemblies, and wherein the method may further comprise:

rotating the second component into a first position relative to the first component;

with the second component in the first position, fixing one end of the first conduit assembly at a first offset from a centre of the second component;

rotating the second component into a second position relative to the first component; and with the second component in the second position, fixing one end of the second conduit assembly at a second offset from a centre of the second component.

Each of the conduit assemblies may comprise a single conduit, or a pair of conduits, or three or more conduits.

The one ends of the first and second conduit assemblies may be at the second port. The other ends of the first and second conduit assemblies may be at the first port, fixed to an umbilical conduit when an umbilical conduit is connected at the first port.

Further conduit assemblies may be present and the above method may be repeated for the further conduit assemblies.

As mentioned above, any feature or group of features of one aspect or embodiment of the present invention, as described and/or shown herein may be provided in conjunction with any other aspects or embodiments, or features or groups of features thereof, described herein, as appropriate and applicable. Furthermore, advantages mentioned in relation to any feature or group of features of one aspect or embodiment of the present invention, may apply to the same feature or group of features when described in relation to any other aspect or embodiment of the present invention.

BRIEF DESCRIPTION OF THE DRAWINGS

Embodiments of the present invention will now be described, by way of example only, with reference to the accompanying drawings, in which.

DETAILED DESCRIPTION

Figure 1:
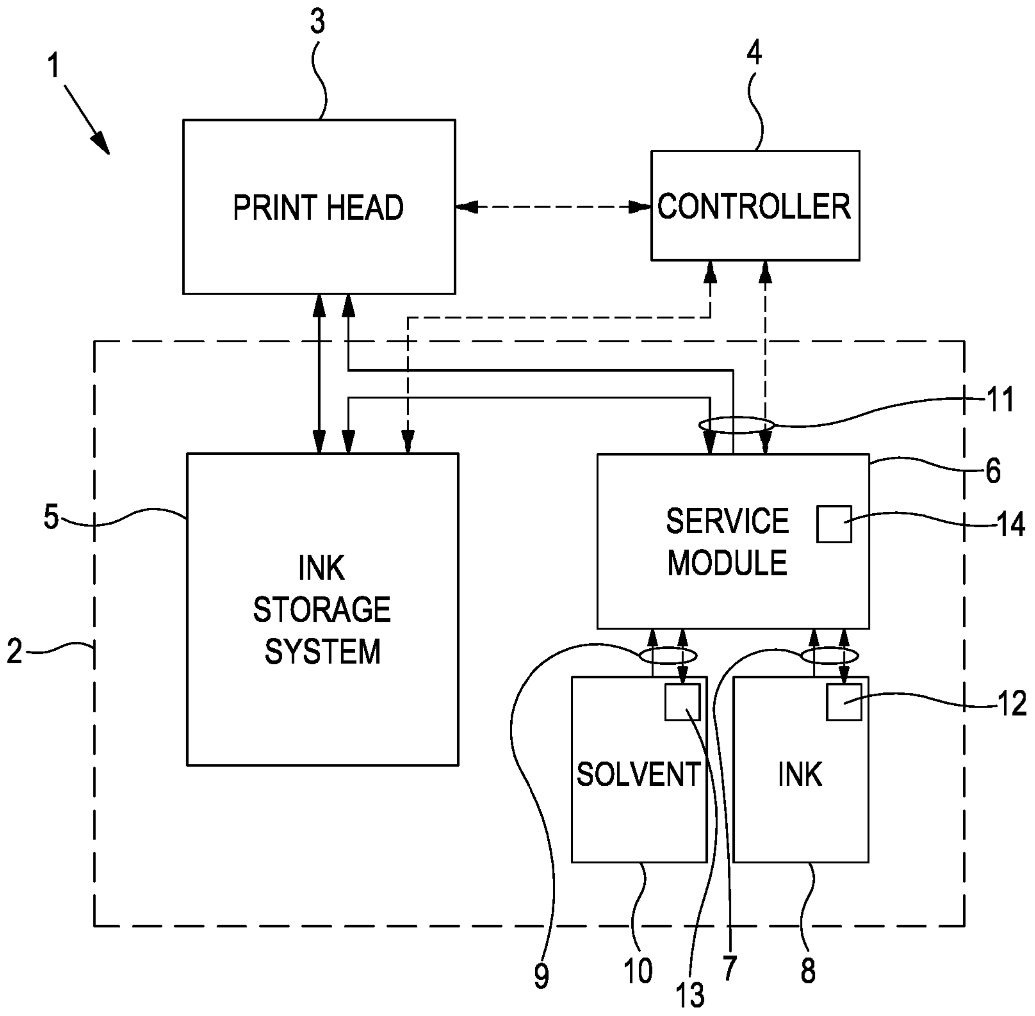
FIG. 1 shows a schematic illustration of an inkjet printer.

FIG. 1 schematically illustrates an inkjet printer 1. Inkjet printer 1 comprises an ink supply system 2, a print head 3 and typically a controller 4. The ink supply system 2 may typically comprise an ink storage system 5 and a service module 6. In FIG. 1, fluid flow through the inkjet printer 1 is illustrated schematically by solid arrows and control signals are illustrated schematically by dashed arrows.

The service module 6 typically comprises two cartridge connections for engagement with a fluid cartridge. In particular, the service module 6 may comprise an ink cartridge connection 7 for engagement with an ink cartridge 8 and a solvent cartridge connection 9 for engagement with a solvent cartridge 10. The service module 6 further comprises a printer connection 11 for releasable engagement with an inkjet printer.

The printer connection 11 typically comprises a plurality of fluid ports, each fluid port arranged to connect to a fluid pathway within the inkjet printer 1 to allow fluid to flow between the service module 6 and other parts of the inkjet printer 1, such as the ink storage system 5 and the print head 3. The printer connection 11 further comprises an electrical connector arranged to engage with a corresponding connector on the inkjet printer 1.

Each of the ink and solvent cartridge connections 7, 9 typically comprises a fluid connector for engaging an outlet of respective ink and solvent cartridges 8, 10 so as to allow fluid to flow from the cartridges 8, 10 into the service module 6. From the service module 6, ink and solvent can flow to the ink storage system 5 via the printer connection 11. In operation, ink from the ink cartridge 8 and solvent from the solvent cartridge 10 can be mixed within the ink storage system 5 so as to generate printing ink of a desired viscosity which is suitable for use in printing. This ink is supplied to the print head 3 and unused ink is returned from the print head 3 to the ink storage system 5. When unused ink is returned to the ink storage system 5 from the print head 3, solvent saturated air may be drawn in with ink from a gutter of the print head 3.

The ink jet printer 1 is typically controlled by controller 4. Controller 4 receives signals from various sensors within the inkjet printer 1 and is operable to provide appropriate control signals to the ink supply system 2 and the print head 3 to control the flow of ink and solvent through the inkjet printer 1. The controller 4 may be any suitable device known in the art, and typically includes at least a processor and memory.

The ink cartridge 8 may be provided with an electronic data storage device 12 storing data relating to contained ink (e.g. type and quantity of ink). Similarly, the solvent cartridge 10 may be provided with an electronic data storage device 13 storing data relating to contained solvent (e.g. type and quantity of solvent).

The service module 6 comprises an electronic data storage device 14. Electronic data storage device 14 may store identification data (e.g. an identification code). Electronic data storage device 14 may also store other types of data, such as identification data relating to the type of ink and/or solvent that the service module 6 can be used with (or has previously been used with), a model number of the service module 6 or inkjet printer 1, a serial number, a manufacture date, an expiration date, a date first used in service, number of hours the service module 6 has been used in the inkjet printer 1, service life, and the like. The controller 4 is arranged to communicate with the electronic data storage devices 12, 13. This communication with the electronic data storage devices 12, 13 of cartridges 8, 10 is via the service module 6. Each of the ink and solvent cartridge connections 7, 9 comprises an electrical contact arranged to contact a corresponding contact on the engaged ink or solvent cartridge 8, 10. The corresponding contact on the cartridges 8, 10 allows information to be read from and/or written to data storage devices 12, 13 respectively via the printer connection 11 of the service module 6.

In operation, ink is delivered under pressure from ink supply system 2 to print head 3 and recycled back via flexible tubes which are bundled together with other fluid tubes and electrical wires (not shown) into an umbilical cable. The ink supply system 2 is typically located in a cabinet and the print head 3 is disposed outside of the cabinet, connected to the cabinet via the umbilical cable.

Figure 2:
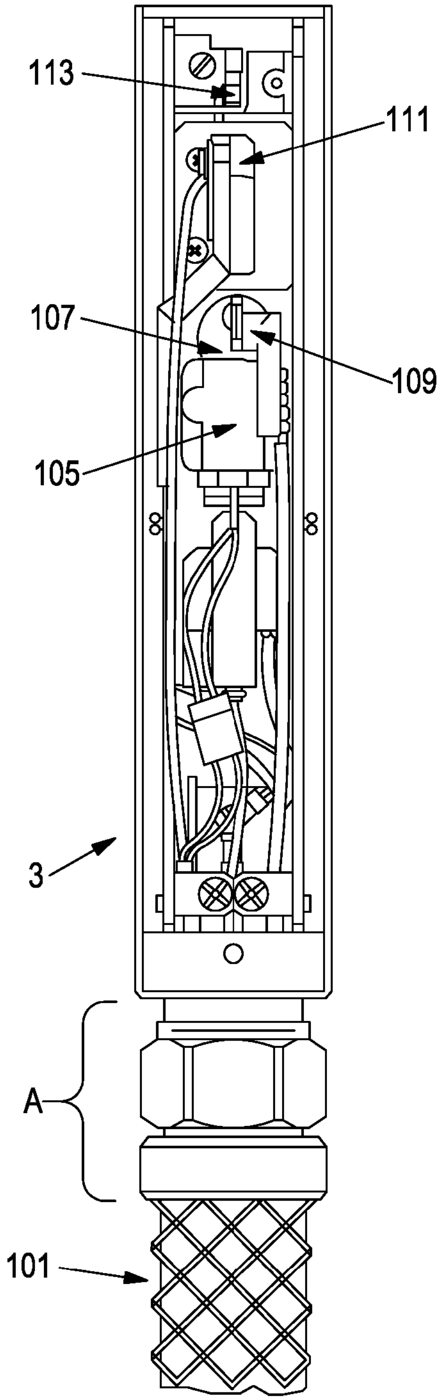
FIG. 2 shows a schematic diagram of a cross section of a print head connected to an umbilical conduit in accordance with the prior art.

Referring to FIG. 2, a schematic diagram of a cross section of an exemplary straight print head 3 for an ink jet printer 1 connected to an umbilical cable or conduit 101 for an ink jet printer 1 is shown in accordance with a prior art print head connector. Amongst other parts either not labelled or not shown, the print head 3 typically contains at least one ink nozzle 105 and ink nozzle orifice 107 for generating ink droplets, a charge electrode 109 for charging the ink droplets, a deflection plate 111 for deflecting any ink droplets charged by said electrode for printing on a moving substrate associated with the print head, and a gutter/ink return 113 for recirculating any uncharged ink droplets. When unused ink is recirculated, the ink return 113 may draw solvent saturated air in with ink from the gutter. The straight print head 3 and umbilical cable 101 are fixedly connected at A.

Continuous ink jet printers supply pressurised ink to a print head 3 droplet generator where a continuous stream of ink emanating from a nozzle 105 is broken up into individual regular drops by, for example, an oscillating piezoelectric element housed in the droplet generator. The drops or droplets are directed past a charge electrode 109 where they are selectively and separately given a predetermined charge before passing through a transverse electric field provided across a pair of deflection plates 111. Each charged drop is deflected by the field by an amount that is dependent on its charge magnitude before impinging on a substrate, whereas the uncharged drops proceed without deflection and are collected at a gutter 113 from where they are recirculated to the ink supply for reuse. The charged drops bypass the gutter 113 and hit the substrate at a position determined by the charge on the drop and the position of the substrate relative to the print head 3. Typically, the substrate is moved relative to the print head 3 in one direction and the drops are deflected in a direction generally perpendicular thereto, although the deflection plates 111 may be oriented at an inclination to the perpendicular to compensate for the speed of the substrate (the movement of the substrate relative to the print head between drops arriving means that a line of drops would otherwise not quite extend perpendicularly to the direction of movement of the substrate).

Figure 3:
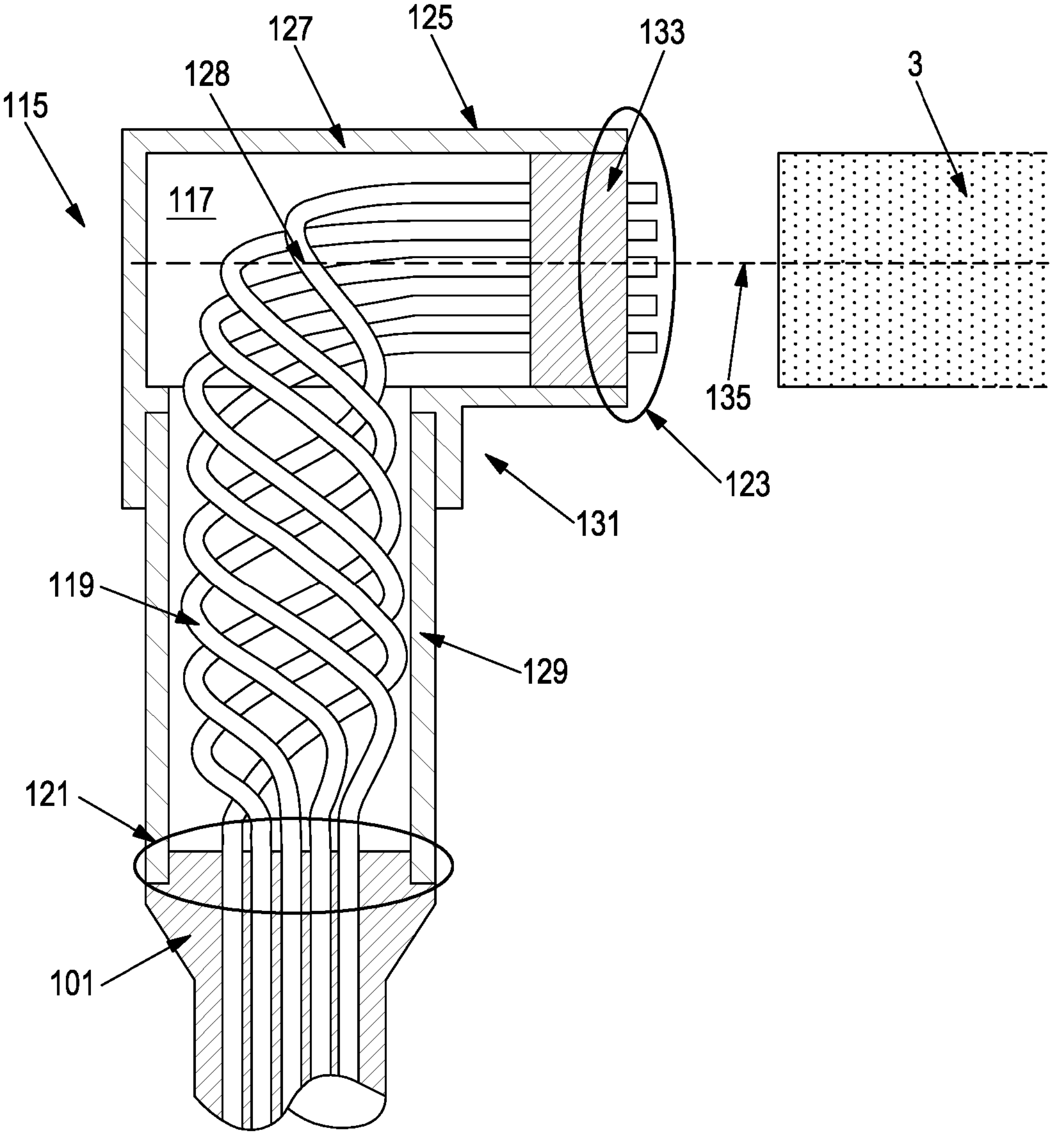
FIG. 3 shows a schematic diagram of a part cross section of an embodiment of a print head connector assembly for connecting to a print head, further showing an exemplary configuration of a pre-twisted conduit configuration.
Figure 4A:
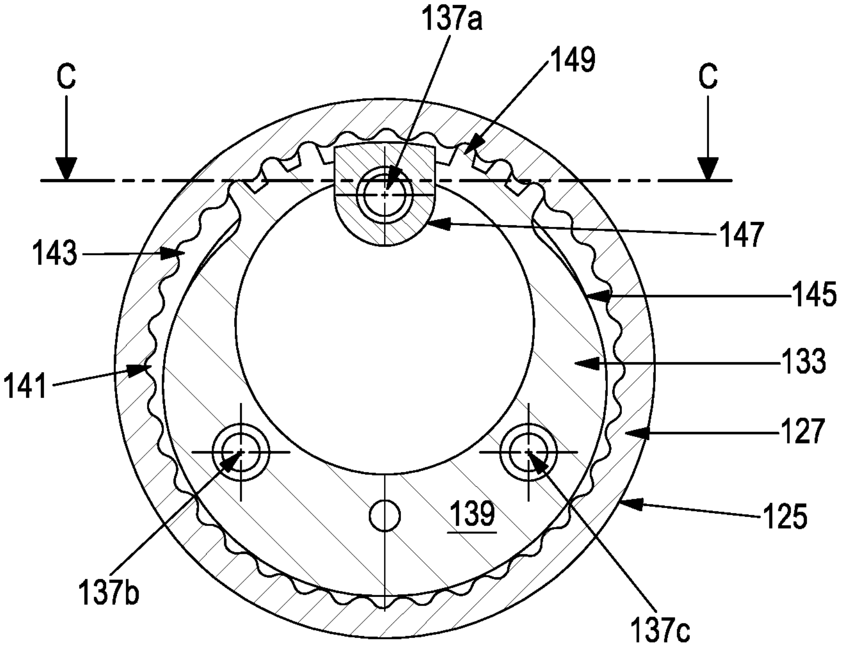
FIG. 4*a* shows a schematic diagram of a cross section of an embodiment of a print head connector assembly.
Figure 4B:
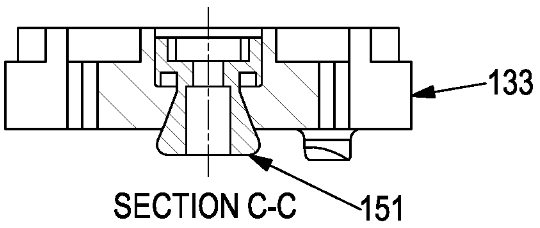
FIG. 4*b* shows a cross section of the embodiment of FIG. 4*a* along the line C-C.
Figure 4C:
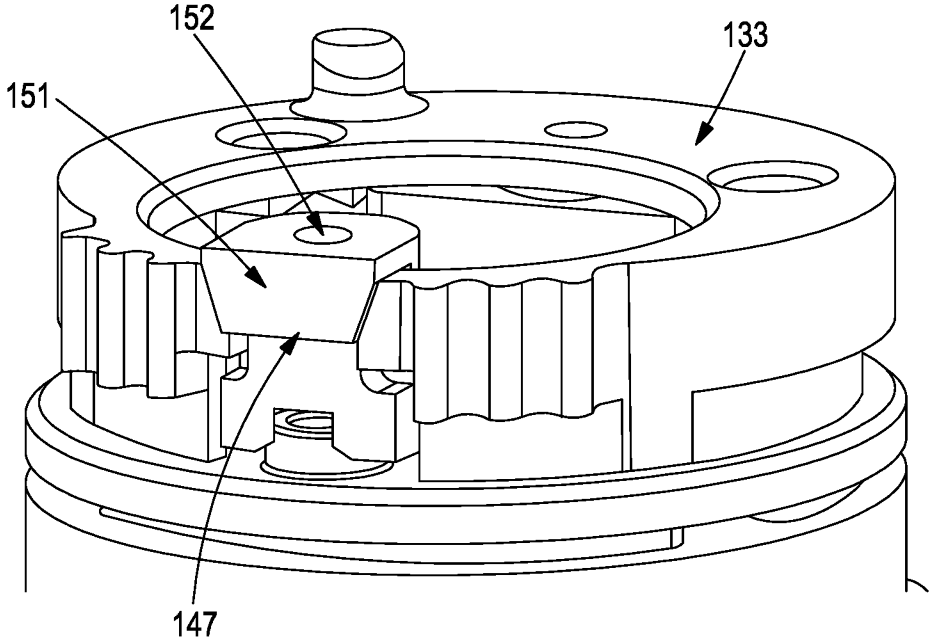
FIG. 4*c* shows a perspective view a second component of an embodiment of a print head connector assembly (with the first component removed for clarity)
Figure 5:
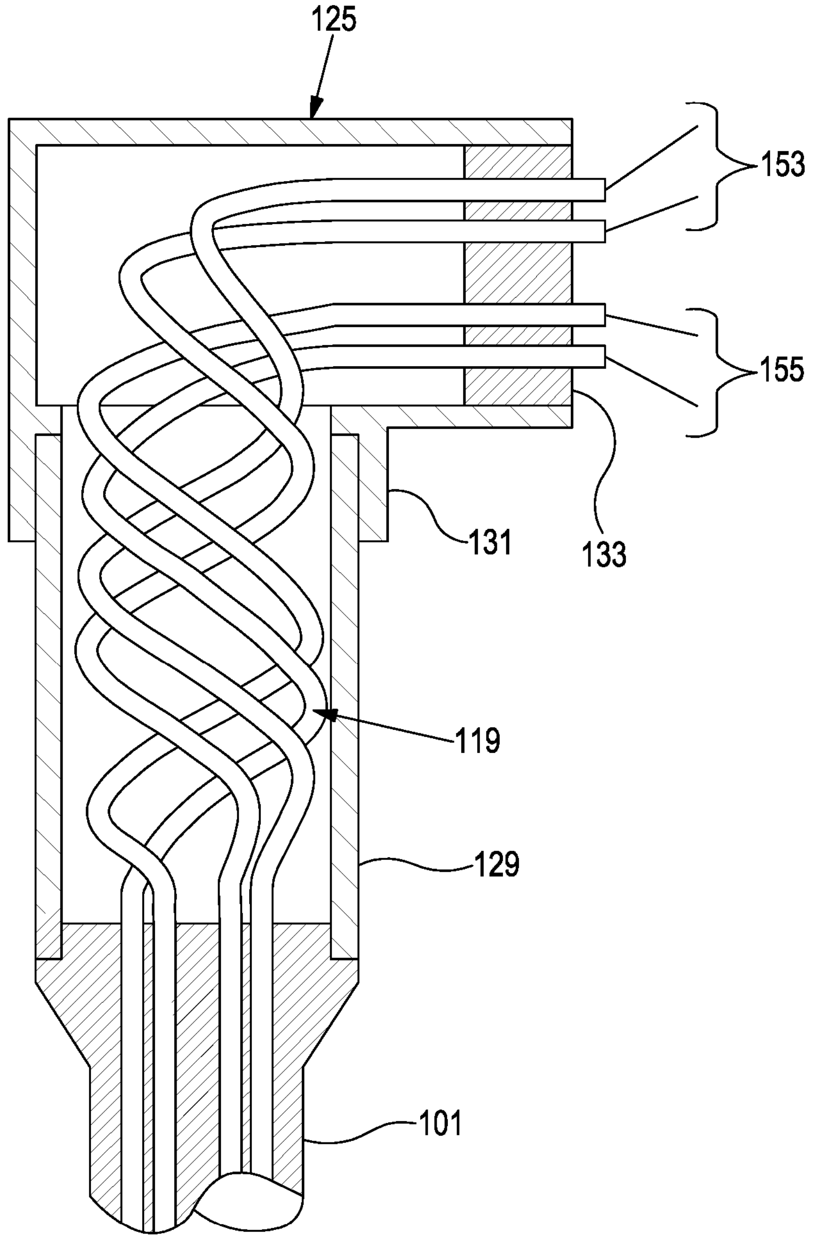
FIG. 5 shows a schematic diagram of a part cross section of an embodiment of a print head connector assembly for connecting to a print head, further showing an exemplary configuration of a pre-twisted conduit configuration that is different to the exemplary configuration shown in FIG. 2.

Referring to FIGS. 3 to 5, and in particular to FIG. 3, there is a print head connector assembly 115 for connecting to a print head 3 for an ink jet printer 1. The print head 3 may be any off-the-shelf print head suitable for the printing job. The print head connector assembly 115 defines an enclosed volume 117, and provides a number of fluid and/or electrical connections, in the form of conduits 119, between a first port 121 of the print head connector assembly 115 and a second port 123 of the print head connector assembly 115. The conduits 119 may house wires for electrical signals or conduits for transporting fluid e.g. liquid or gas. These may comprise one or more of ink supply, ink return, air supply, control signals, sensor data, and high voltage supply to deflection electrodes. The first port 121 is for connecting to an umbilical cable 101 for an ink jet printer 1 and the second port 123 is for connecting to the print head 3. The umbilical cable 101 runs from a printer cabinet (not shown) of the ink jet printer 1 or otherwise.

With further reference to FIGS. 3 and 4*a*, the print head connector assembly 115 comprises a first component 125 connectable to the umbilical cable 101 at the first port 121. The first component 125 is hollow.

Optionally, the first component 125 comprises a substantially straight hollow connector 127 for connecting to the umbilical cable 123, and optionally the substantially straight hollow connector 127 is tubular. The straight hollow connector 127 and the first component 125 define an axial, longitudinal axis, or a print head connection axis, 128.

However, in alternative embodiments, as is shown in FIG. 3, the first component 125 comprises a first hollow connector 127, a second hollow connector 129, and an elbow connector 131 attaching the first hollow connector 127 to the second hollow connector 129 to provide the first component 125 with a 90° bend. Preferably, the elbow connector 131 is fixed, although in alternative embodiments the elbow connector 131 can be adjustable to provide rotation between the first hollow connector 127 and the second hollow connector 129. Optionally, the first hollow connector 127 and the second hollow connector 129 are tubular.

The print head connector assembly 115 also comprises a second component 133 which is received in an end of the first component 125 at the second port 123. The first component 125 and the second component 133 are releasably engageable. Preferably, the second component 133 is an incomplete tubular shape or incomplete disc shape. The first component 125 has a cylindrical lip (not shown) on an inner surface thereof for preventing axial movement of the second component 123 in the first component 125.

The second component 133 is hollow and is for connecting to the print head 3. The second component 133 comprises an axial, longitudinal axis, or a print head connection axis, 135, which substantially aligns with an axial, longitudinal axis of the print head 3, or a print head connection axis, connection of the print head 3, when the print head 3 is connected to the print head connector assembly 115.

Referring in particular to FIG. 4*a*, to connect to the print head 3, the second component 133 comprises three mounting screw holes 137*a*, 137*b*, 137*c* (or in other embodiments, two, or four, or more than four mounting screw holes) on an end surface 139 thereof (or on both end surfaces thereof) for cooperating with a corresponding three mounting screw holes on the print head 3. In cross section, the three mounting screw holes 137*a*, 137*b*, 137*c* are positioned on the three points of an imaginary triangle. Print heads typically have a standard configuration of three mounting screw holes located at the three points of an imaginary triangle on an end surface thereof, and so this makes the print head connector assembly 115 compatible with many off-the-shelf print heads.

The second component 133 may be fully received in the first component 125. The second component 133 may be positioned in the first component 125 such that when the print head 3 is connected to the second component 133, the first component 125 surrounds a part of the print head 3 too.

At least at an end of the first component 125 at the second port 123, an inner surface 141 thereof is jagged, comprising a plurality of spaced apart notches 143. This allows the first component 125 to act as an internal gear. The inner surface 141 has a substantially circular cross section. In embodiments, the notches 143 extend all of the way around the circumference of the inner surface 141. Preferably, the notches 143 are spaced apart at regular intervals around the circumference of the inner surface 141, and preferably spaced apart such that adjacent notches 143 have an angular offset of approximately 10°. In alternative embodiments, the notches 143 may only extend part way around the circumference of the inner surface 141. The plurality of notches 143 effectively provides a corresponding plurality of teeth between the notches 143. The first component 125 may comprise a first plurality of indicators, for example visual markings, by each one of, or by a number of, the plurality of notches 143, indicating the relative rotational relationship between the first component 125 and the second component 133 at that point. The visual markings may comprise a number. The second component 133 may comprise a single, second indicator for cooperating with the first plurality of indicators to indicate the relative rotational relationship between the first component 125 and the second component 133 at that point. For example, where a single marking on one of the components aligns with a number '90' on the other of the components, this may indicate a 90 degree rotated respective relationship, and where the single marking on one of the components aligns with a number '180' on the other of the components, this may indicate a 180 degree rotated respective relationship.

Referring more particularly to FIG. 4*a*, the second component 133 has an incomplete cross section that allows the second component 133 to possess some spring-like properties. The second component 133 may be made of a resilient material. Preferably, as mentioned, the second component 133 is an incomplete tubular shape or disc shape, and so the second component 133 has a discontinuous outer surface 145 that is substantially arcuate in cross section. At the discontinuity, a lock 147 is arranged to connect the two edges of the arc, to give the second component 133 an effective substantially circular cross section. The lock 147 is for locking the print head connector assembly 115 in each of the plurality of configurations having a respective rotational relationship between the first component 125 and the second component 133. The lock 147 has a locked configuration and an unlocked configuration. When the locking component is in its locked configuration, the force required to rotate the second component relative to the first component is greater than the force required to rotate the second component relative to the first component when the locking component is in its unlocked configuration.

A plurality of spaced apart gear teeth 149 is disposed on at least a part of the outer surface 145 of the second component 133. This allows the second component 133 to act as an external gear. Preferably, the teeth 149 are spaced apart at regular intervals around a part of the circumference of the outer surface 145, and preferably spaced apart such that adjacent teeth 149 have an angular offset of approximately 10°. The teeth 149 generally have an angular offset that is equal to the angular offset of the notches 143 to help engagement therebetween. The teeth 149 may only extend around the outer surface 145 by an angular offset of less than or equal to 90°. Alternatively, the teeth 149 may extend further around the circumference of the outer surface 145. The teeth 149 may or may not extend around the entire circumference of the outer surface 145. The second component 133 may comprise a first plurality of indicators, for example visual markings, by each one of, or by a number of, the plurality of teeth 149, indicating the relative rotational relationship between the first component 125 and the second component 133 at that point. The visual markings may comprise a number. The first component 125 may comprise a single, second indicator for cooperating with the first plurality of indicators to indicate the relative rotational relationship between the first component 125 and the second component 133 at that point. For example, where a single marking on one of the components aligns with a number '10' on the other of the components, this may indicate a 10 degree rotated respective relationship, and where the single marking on one of the components aligns with a number '350' on the other of the components, this may indicate a 350 degree rotated respective relationship.

As mentioned, the first component 125 and the second component 133 are releasably engageable. The first component 125 with notches 143 and the second component 133 with teeth 149 provide means for adjusting the print head connector assembly 115 into a plurality of configurations, wherein in each of the plurality of configurations the first component 125 has a respective rotational relationship with the second component 133. In each of the plurality of configurations, the axial, longitudinal axis (or print head connection axis) 128 of the first component 125 (which also defines the axis of rotation of the first component 125) and the axial, longitudinal axis (or print head connection axis) 135 of the second component 133 (which also defines the axis of rotation of the second component 133) are substantially parallel and aligned. Substantially parallel and aligned allows for manufacturing tolerances that means the various parts don't have exactly the intended position. Teeth 149 and cooperating notches 143 are a simple but effective way of providing for relative rotation and cooperation between the first component 125 and the second component 133.

The notches 143 and teeth 149 are provided with cooperating shapes so that the notches 143 and teeth 149 can be more easily engaged with one another. In embodiments, when the print head connector assembly 115 is in one of the plurality of configurations, the teeth 149 on the second component 133 interdigitate the teeth that correspond to the notches 143 on the first component 125.

When the lock 147 is in its unlocked configuration, and so the print head connector assembly 115 is in a disengaged configuration, the second component 133 has sufficient flexion and sufficient space provided by the discontinuity, such that, when torque is applied to the second component 133, the teeth 149 can slide over the notches 143 (or their corresponding teeth) as the second component 133 rotates within the first component 125. The materials and configuration used may be such that a clicking sound is produced as one of the teeth 149 slides past or over one of the notches 143 (or their corresponding teeth). In this way, the user can tell by listening as to how much the second component 133 has rotated in the first component 125 and so can immediately know what orientation the print head connector assembly 115 is in.

Referring to FIGS. 4*a*, 4*b* and 4*c*, the lock 147 comprises a wedge shaped component 151. When the lock is in its unlocked configuration, the wedge shaped component 151 is partially inserted in the discontinuity in the second component 133 such that the part of the wedge shaped component 151 inserted is smaller than, or only as large as, the space defined by the cross section at the discontinuity. Alternatively, the wedge shaped component 151 can be axially displaced from the second component 133 and the discontinuity when the lock is in its disengaged configuration. The second component 133 is therefore able to bend or flex into the space defined by the cross section when torque is applied to the second component 133, the teeth 149 and/or notches 143 flexing to move over each other to allow the second component 133 to rotate relative to the first component 125. The space defined by the discontinuity may vary along the length of the second component 133.

When in the unlocked configuration, the teeth 149 and notches 143 may be in a partially engaged position, but whereby the teeth 149 and/or notches 143 can flex to move over one another. Partially engaged may mean that there is a level of interdigitation between the teeth 149 and the teeth corresponding to the notches 143 but there is space defined between ends of the teeth 149 and bases of the notches 143.

In embodiments, the wedge shaped component 151 comprises a through hole 152 that provides one of the three mounting screw holes 137*a* on the second component 133. To move the lock 147 into its locked configuration, a mounting screw (used to mount the print head 3 to the print head connector assembly 115) is inserted into the through hole and tightened to cause the wedge shaped component 51 to move axially into the second component 33, in particular into the discontinuity. The part of the wedge shaped component 151 being urged into the discontinuity is equal to or larger than the space defined by the part of the discontinuity into which it is urged. As such, the wedge shaped component 151 may exert an outwards pressure on the second component 133 at the discontinuity in the incomplete cross section. This prevents the second component 133 from bending or flexing into the space defined by the discontinuity when torque is applied to the second component 133. Having the lock 147 in its engaged configuration therefore prevents the second component 133 rotating relative to the first component 125 when torque is applied to the second component 133.

To move the lock 147 back into its unlocked configuration, the screw is untightened to move the wedge shaped component 151 axially away from the second component 133 and out of the discontinuity. Therefore, the two edges of the second component 133 on either side of the discontinuity are no longer being urged apart by the wedge shaped component 151.

Referring in particular to FIGS. 3 and 5, the conduits 119 are fixed at the connection to the umbilical cable 101 at the first port 121, and are also fixed at the connection to the print head 3 at the second port 123. In embodiments, the conduits 119 are otherwise free to move within the enclosed volume 117. In embodiments, the conduits 119 are pre-twisted during assembly of the print head connector assembly 115 and are configured with additional slack so that the conduits 119 do not follow the shortest path through the print head connector assembly 115. This allows the conduits 119 to have a smaller bend radius than would otherwise be possible. This helps account for subsequent movement and/or twisting of the conduits 119 within the enclosed volume once the print head connector assembly 15 is assembled, and so provides for reduced stresses experienced by the conduits 119 in use, for instance when the second component 133 is rotated relative to the first component 125.

Referring to FIG. 5, an embodiment of a print head connector assembly 115 is shown, in which the conduits 119 are pre-twisted during assembly. For simplicity, there are two sets 153, 155 of conduits shown. One set 153 is fixed with an offset from the centre of the first component 125 at the maximum position. This assumes that the other end of the set 153 is already fixed (e.g. is part of a larger cable harness). The print head connector assembly 115 is then turned to a second position by rotating the second component 133 within the first component 125 by 180°. The second set 155 is allowed to freely twist around the first set and is then fixed in place. It will be appreciated that the different sets 153, 155 may therefore require different fastenings. It will be appreciated that in embodiments, there are more than two sets of conduits present. This pre-twisting principle may be extended to the additional sets when they are present, so that the different sets are fixed one at a time.

Figure 6A:
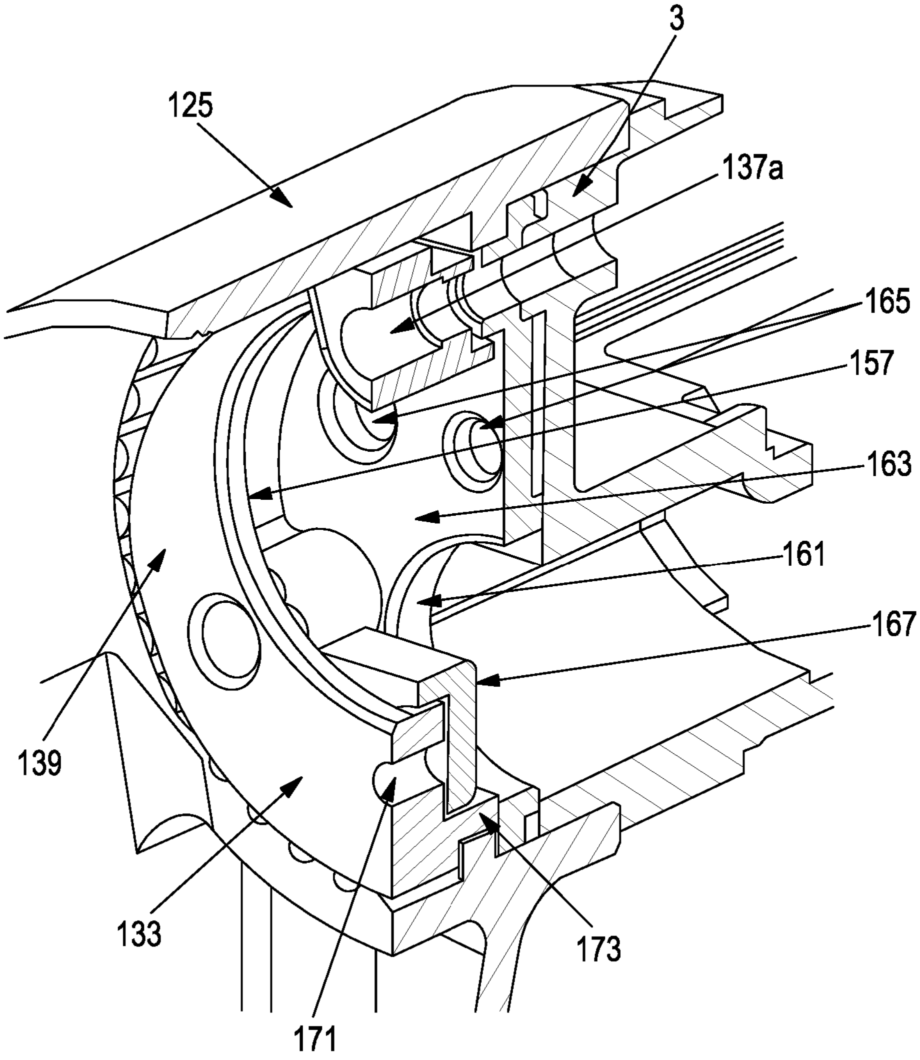
FIG. 6*a* shows a cutaway schematic diagram of an embodiment of a print head connector assembly including an example of a clamp.

Referring to FIG. 6*a*, a print head 3 is shown connected to the print head connector assembly 115. Specifically, the second component 133 is connected to the print head 3 using three mounting screws (not shown in the figure and in other embodiments two or four or more than four mounting screws could be used), and the first component 125 surrounds the second component 133 and a part of the print head 3.

Referring to FIGS. 6*a*, 6*b*, 6*c* and 7, in embodiments, the print head connector assembly 115 comprises a guide assembly for allowing the at least one conduit to pass through the second component 133. The second component 133 comprises a first aperture 157 in an end surface 139 thereof. In embodiments, the print head connector assembly 115 comprises a second aperture 161 at the second port 123. In embodiments, the second aperture 157 may be provided by a gasket plate 163 for sealing a connection between the second component 133 and the print head 3 when connected. The second aperture 161 may be smaller than the first aperture 157, and the first aperture 157 and the second aperture 161 may have different centre axes (for instance as shown in FIG. 6). The guide assembly comprises the first aperture 157 and the second aperture 161. The conduit 19 that passes through the second aperture 161 may carry an electric cable that connects from a printed circuit board (PCB) in a print head 3 at the second port 123, to an umbilical conduit 101 at the first port 121, when a print head 3 and umbilical conduit 101 are connected to the print head connector assembly 115. Referring to FIG. 6*a*, the gasket plate 163 may comprise a further set of apertures 165 for allowing conduits 19, carrying fluid conduits, to pass therethrough.

In embodiments, the print head connector assembly 115 is provided with a clamp 167 for clamping one or more sets of conduits 119, particularly conduits 119 for carrying electrical connections therein, within the print head connector assembly 115. In a relaxed position as shown in FIG. 6*a*, the clamp 167 is positioned adjacent the first aperture 157, directly against a face of the second component 133, between the first aperture 157 and the second aperture 161. The clamp 167 is configured to be displaced axially, substantially parallel to the axial, longitudinal axis, or print head connection axis, 135, between the first aperture 157 and the second aperture 161.

Figure 6B:
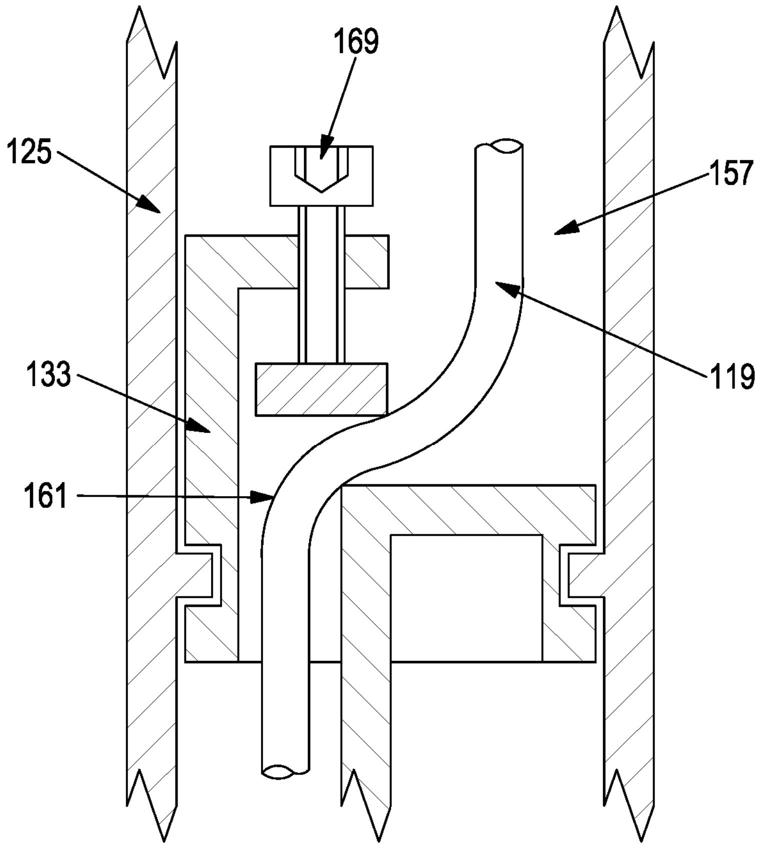
FIG. 6*b* shows a schematic diagram of a part of an embodiment of a print head connector assembly including an example of a clamp in a clamping position.
Figure 6C:
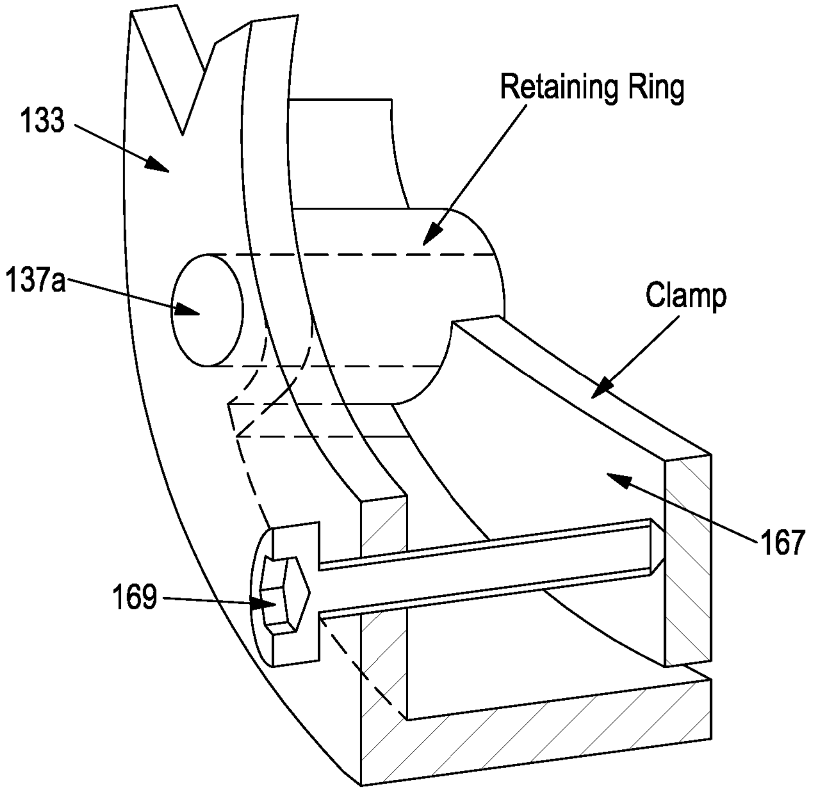
FIG. 6*c* is a perspective view of a part of the print head connector assembly shown in FIG. 6*b*.

The clamp 167 is activated, and displaced, by use of a screw 169, the screw hole 171 being positioned through the second component 133. When the screw is in an untightened configuration, and the clamp 167 in the relaxed position, the clamp 167 is positioned adjacent the first aperture 157. When the clamp 167 is activated, and the screw is moved into a tightened configuration, the clamp 167 is urged away from the first aperture 157 and towards the second aperture 161 into a clamping position as shown in FIG. 6*b*, so that the gap defined between the second aperture 161 and the clamp 167 is reduced as the clamp 167 moves further towards the second aperture 161. The gap can be reduced to match the size of any conduits passing from the print head 3, through the second aperture 161, into the second component 133, through the first aperture 157 and into the first component 125, so that the conduits are effectively clamped within the print head connector assembly 115.

In some embodiments, the second component may provide a ledge 173 adjacent the first aperture 157 for the clamp 167 to rest on in just the relaxed position or in the relaxed position or one or more clamping positions.

Figure 7:
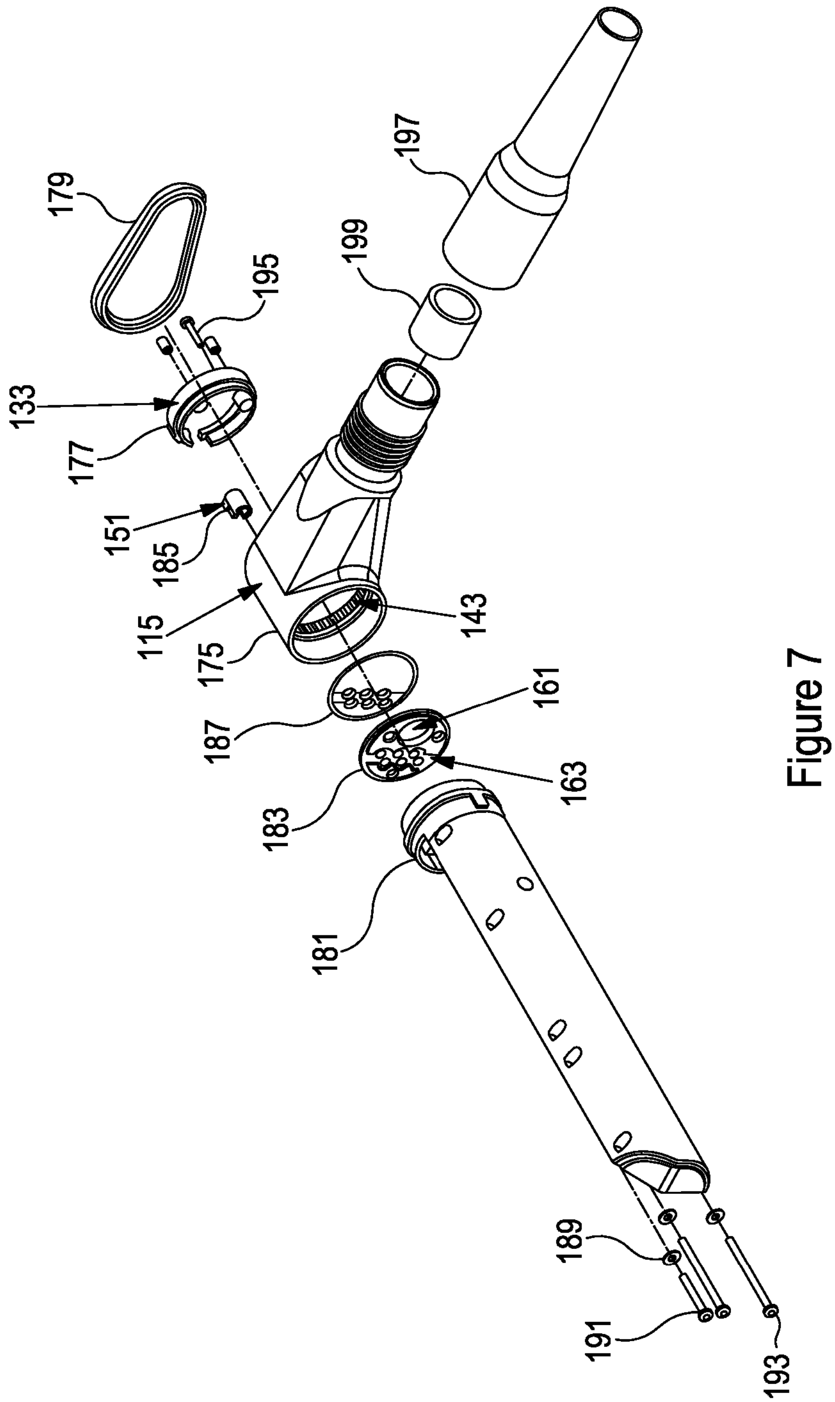
FIG. 7 shows an exploded view of an embodiment of a print head connector assembly.

Referring to FIG. 7, there is shown an elbow 175, inner ring 177, lid 179, printhead chassis 181, gasket plate 183, wedge 185, gasket 187, washer 189, screws 191, 193, 195, an overmould 197, and portion 199. As will be appreciated, the wedge 185 may correspond to the wedge shaped component 151, the inner ring 177 may correspond to the second component 133, and the gasket plate 183 may correspond to the gasket plate 163.

Still referring in particular to FIG. 7, there are various ways to assemble the print head connector assembly 115. In an embodiment having two sets of conduits 119 (although it is of course possible that more sets of conduits are used), the various components of the print head connector assembly 115 can be assembled as shown in FIG. 7.

With the print head connector assembly 115 in the neutral 0° position, a first set of (two although more could be included) conduits 119 are passed through the print head connector assembly 115 following an appropriate path, there being a larger bend in this position. The component labelled 175 in FIG. 7, the elbow, provides the first component 125 with a 90° bend therein. In other embodiments, there may be no 90° bend.

With the print head connector assembly 115 still in the neutral 0° position, a second set of (two although more could be included) conduits 119 are passed through the print head connector assembly 115 and through the opening of the first component 125 nearest component labelled 199.

The first and second sets of conduits 119 are then pushed into the print head connector assembly 115 by an excessive amount i.e. an amount that provides more conduit length then is required to reach from the umbilical to the intended connection location, and any connectors are fitted, that may or may not be required for the first set of conduits, at an appropriate length. The first and second sets of conduits 119 are then pulled back to the correct position.

The first second sets of conduits 119 are then clamped, by the clamp 167, in the neutral 0° position without twist. The print head connector assembly 115 is twisted to a +180° offset (a relative rotation between the first component and the second component) and the second set of conduits 119 are then passed through the print head connector assembly 115 following an appropriate path. The second set of conduits 119 are then clamped in this position. It is now possible for both of the first and second sets of conduits 119 to be twisted with a minimised twisting angle, and so with minimised stress.

The above embodiments are described by way of example only. Many variations are possible without departing from the scope of the invention as defined in the appended claims.

The invention claimed is:

1. A print head connector assembly for a printer, the print head connector assembly comprising:

a first component connectable to an umbilical conduit at a first port;

a second component connectable to a print head at a second port, wherein one of the first component and the second component defines a print head connection axis at the second port and an other of the first component and the second component defines an axis of rotation;

an adjustment assembly between the first component and the second component for adjusting the print head connector assembly into a plurality of configurations, wherein each of the plurality of configurations has a respective rotational relationship between the first component and the second component, and wherein in each of the plurality of configurations the print head connection axis and the axis of rotation are substantially parallel and aligned; and a locking component that is axially displaceable along the axis of rotation for locking the print head connector assembly in each of the plurality of configurations, the locking component having a locked configuration and an unlocked configuration;

wherein the print head connector assembly defines an enclosed volume between the first port and the second port;

wherein at least one of the first component and the second component comprises an open section between two edges, the locking component being disposed at the open section and being at least partially receivable in the open section to urge the two edges outwardly away from one another;

wherein in the locked configuration the at least one of the first component and the second component comprising the open section is urgeable into engagement with the other of the first component and the second component by outward displacement of the two edges by the locking component, to secure the first component and the second component in that rotational position;

wherein at least two continuous fluid connections are provided between the first port and the second port, each continuous fluid connection being provided by a respective port conduit of the print head connector assembly which extends through the first component and the second component between the first port and the second port; and wherein the locking component comprises a through hole for receiving a fastening member therethrough.

2. The print head connector assembly of claim 1, wherein the first component and the second component are configured to have a variable resistance to relative rotation, wherein the variable resistance to relative rotation is a function of the respective rotational relationship between the first component and the second component.

3. The print head connector assembly of claim 2, wherein when the first component and the second component are in one of the plurality of configurations, the first component and the second component are configured to have a first resistance to relative rotation, and when the first component and the second component are in an intermediate position between two of the plurality of configurations, the first component and the second component are configured to have a second resistance to relative rotation, wherein the first resistance to relative rotation is greater than the second resistance to relative rotation.

4. The print head connector assembly of claim 1, wherein the adjustment assembly comprises a first engagement feature on the first component, and a second engagement feature on the second component for cooperating with the first engagement feature in each of the plurality of configurations.

5. The print head connector assembly of claim 4, wherein the first component is hollow, and wherein the first engagement feature comprises a first plurality of spaced apart retaining features disposed on a surface of the first component.

6. The print head connector assembly of claim 5, wherein the first plurality of spaced apart retaining features are disposed around a circumference of an inner surface of the first component.

7. The print head connector assembly of claim 5, wherein the first plurality of spaced apart retaining features are spaced apart at regular intervals.

8. The print head connector assembly of claim 7, wherein the first plurality of spaced apart retaining features are spaced apart such that adjacent retaining features have an angular offset of approximately 10 degrees.

9. The print head connector assembly of claim 8, wherein the first plurality of spaced apart retaining features are notches.

10. The print head connector assembly of claim 4, wherein the second engagement feature comprises a second plurality of spaced apart retaining features disposed on at least a part of a surface of the second component, and wherein the at least a part of the second component is configured to engage with the first component.

11. The print head connector assembly of claim 10, wherein the second plurality of spaced apart retaining features are disposed around at least a part of a circumference of an outer surface of the second component, and wherein at least a part of the second component is received in the first component.

12. The print head connector assembly of claim 10, wherein the second plurality of spaced apart retaining features are spaced apart at regular intervals.

13. The print head connector assembly of claim 12, wherein the second plurality of spaced apart retaining features are spaced apart such that adjacent retaining features have an angular offset of approximately 10 degrees.

14. The print head connector assembly of claim 10, wherein the first engagement feature comprises a first plurality of spaced apart notches, wherein the second plurality of spaced apart retaining features are teeth, and wherein the teeth and the first plurality of spaced apart notches are configured for engagement with each other.

15. The print head connector assembly of claim 1, wherein the second component comprises a plurality of mounting holes on an end surface thereof for cooperating with a corresponding plurality of mounting holes on a print head.

16. The print head connector assembly of claim 1, wherein when the locking component is in the locked configuration, a third force is required to rotate the second component relative to the first component, and when the locking component is in the unlocked configuration, a fourth force is required to rotate the second component relative to the first component, wherein the third force is greater than the fourth force.

17. The print head connector assembly of claim 16, wherein the second component has a cross section comprising the open section between the two edges, the second component being urgeable into a locked configuration in which the two edges are forced outwardly away from one another, and wherein the locking component is configured and arranged to urge the second component into its locked configuration, the second component being in its locked configuration when the locking component is in its locked configuration.

18. The print head connector assembly of claim 1, wherein the first component comprises a substantially right-angled bend therein.

19. The print head connector assembly of claim 18, wherein the first component comprises a first member and a second member, and wherein the first member is connected to the second member at substantially a right angle.

20. The print head connector assembly of claim 19, wherein a connection between the first member and the second member is rotatable to allow the first member to rotate relative to the second member.

21. The print head connector assembly of claim 1, the port conduits being free to move within the enclosed volume, wherein the port conduits are arranged in a pretwisted configuration and are sufficiently slack to allow for movement and/or twisting of the port conduits within the enclosed volume.

22. The print head connector assembly of claim 1, wherein the print head connector assembly comprises a guide assembly for allowing the port conduits to pass through the second component, and wherein the print head connector assembly further comprises a clamp configured to secure the port conduits in the print head connector assembly.

23. The print head connector assembly of claim 22, wherein the second component comprises a first aperture, and wherein a second aperture is defined at the second port, and wherein the guide assembly comprises the first aperture and the second aperture, and wherein the clamp is configured to move axially away from the first aperture and towards the second aperture to reduce an effective size of the second aperture for securing the port conduits in the print head connector assembly.

24. The print head connector assembly of claim 1, wherein at least two electrical connections are provided between the first port and the second port, each electrical connection being provided by a respective port conduit which extends through the first component and the second component between the first port and the second port.

25. The print head connector assembly of claim 1, wherein the plurality of configurations comprises three or more configurations.

26. The print head connector assembly of claim 25, wherein the plurality of configurations comprises more than four configurations.

27. The print head connector assembly of claim 26, wherein the plurality of configurations comprises thirty five or more configurations.

28. The print head connector assembly of claim 1, wherein the printer comprises an ink jet printer.

29. The print head connector assembly of claim 28, wherein the printer comprises a continuous ink jet printer.

30. A printer comprising:

a printer cabinet connected to an umbilical conduit;

a print head; and a print head connector assembly, the print head connector assembly comprising:

a first component connectable to the umbilical conduit at a first port;

a second component connectable to the print head at a second port, wherein one of the first component and the second component defines a print head connection axis at the print head and an other of the first component and the second component defines an axis of rotation;

an adjustment assembly between the first component and the second component for adjusting the print head connector assembly into a plurality of configurations, wherein each of the plurality of configurations has a respective rotational relationship between the first component and the second component, and wherein in each of the plurality of configurations the print head connection axis and the axis of rotation are substantially parallel and aligned; and a locking component that is axially displaceable along the axis of rotation for locking the print head connector assembly in each of the plurality of configurations, the locking component having a locked configuration and an unlocked configuration;

wherein the print head connector assembly is arranged to connect the print head to the umbilical conduit such that the print head is adjustable into, and lockable in, the plurality of configurations each having a respective rotational relationship between the first component and the second component;

wherein the print head connector assembly defines an enclosed volume between the first port and the second port;

wherein at least one of the first component and the second component comprises an open section between two edges, the locking component being disposed at the open section and being at least partially receivable in the open section to urge the two edges outwardly away from one another;

wherein in the locked configuration the at least one of the first component and the second component comprising the open section is urgeable into engagement with the other of the first component and the second component by outward displacement of the two edges by the locking component, to secure the first component and the second component in that rotational position;

wherein at least two continuous fluid connections are provided between the first port and the second port, each continuous fluid connection being provided by a respective port conduit of the print head connector assembly which extends through the first component and the second component between the first port and the second port; and wherein the locking component comprises a through hole for receiving a fastening member therethrough.

31. A method of assembling and adjusting a print head connector assembly, comprising:

connecting a first component to an umbilical conduit at a first port;

connecting a second component to a print head at a second port, wherein one of the first component and the second component defines a print head connection axis, and an other of the first component and the second component defines an axis of rotation;

aligning the print head connection axis with the axis of rotation such that the print head connection axis and the axis of rotation are substantially parallel, and bringing the first component and the second component into engagement with one another;

adjusting a relative rotational relationship between the first component and the second component using an adjustment assembly between the first component and the second component, the adjustment assembly being for adjusting the print head connector assembly into a plurality of configurations, wherein each of the plurality of configurations has a respective rotational relationship between the first component and the second component, and wherein in each of the plurality of configurations the print head connection axis and the axis of rotation are substantially parallel and aligned;

locking the print head connector assembly in a configuration, corresponding to the relative rotational position between the first and second components, using a locking component that is axially displaceable along the axis of rotation, the locking component having a locked configuration and an unlocked configuration, wherein in the locked configuration the locking component is axially displaced and received in an open section, between two edges, of at least one of the first component and the second component to urge the two edges outwardly away from one another and into engagement with the other of the first component and the second component to secure the first component and the second component in that rotational position wherein the print head connector assembly defines an enclosed volume between the first port and the second port;

wherein at least two continuous fluid connections are disposed between the first port and the second port, each continuous fluid connection being established by a respective port conduit of the print head connector assembly which extends through the first component and the second component between the first port and the second port; and wherein the locking component comprises a through hole for receiving a fastening member therethrough.

32. The method of claim 31, wherein the print head connector assembly provides a continuous fluid connection assembly provided by a first conduit assembly comprising the port conduits which provide the at least two continuous fluid connections, and provides a continuous electrical connection assembly provided by a second conduit assembly, and wherein the method further comprises:

rotating the second component into a first position relative to the first component;

with the second component in the first position, fixing one end of the first conduit assembly at a first offset from a centre of the second component;

rotating the second component into a second position relative to the first component; and with the second component in the second position, fixing one end of the second conduit assembly at a second offset from a centre of the second component.

33. The print head connector assembly for a printer of claim 1, wherein the print head comprises an ink nozzle, a charge electrode, a deflection plate, and a gutter return.

34. The print head connector assembly for a printer of claim 1, wherein the respective port conduits, which provide the at least two continuous fluid connections, pass from the first port to at least the second port.

35. The printer head assembly of claim 1, wherein the locking component is axially displaceable along an axis of the locking component to change between the locked configuration and the unlocked configuration.

36. The print head connector assembly of claim 1, wherein the axis of the locking component is substantially parallel with an axial, longitudinal axis of the first component and an axial, longitudinal axis of the second component.

37. The print head connector assembly of claim 1, wherein the through hole provides a mounting hole on an end surface of the second component.

38. The print head connector assembly of claim 37, further comprising a fastening member to be positioned in the through hole and configured to fasten the locking component into the locked configuration.

39. The print head connector assembly of claim 1, wherein the open section comprises a discontinuity, wherein the locking component is in an unlocked configuration while the locking component partially inserted into the discontinuity in the second component.

40. The print head connector assembly of claim 1, wherein the open section comprises a discontinuity, wherein the locking component is to be positioned in the discontinuity in the second component to move the locking component into the locked configuration.

41. The print head connector assembly of claim 1, wherein the open section comprises a discontinuity, wherein a shape of the second component comprises an incomplete disc shape having the discontinuity, and wherein the second component is hollow and through which the respective port conduit for each continuous fluid connection extends through the second component, and wherein the locking component is to be positioned in the discontinuity in the incomplete disc shape of the second component to move the locking component into the locked configuration.

* * * * *